(12) United States Patent
Lago

(10) Patent No.: US 7,762,388 B2
(45) Date of Patent: Jul. 27, 2010

(54) BELT OF A CHAIN CONVEYOR WITH INNOVATIVE DRIVE LINKS

(75) Inventor: Leopoldo Lago, Cittadella Padova (IT)

(73) Assignee: Tecno Pool S.p.A., San Giorgio in Bosco (IT)

(*) Notice: Subject to any disclaimer, the term of this patent is extended or adjusted under 35 U.S.C. 154(b) by 378 days.

(21) Appl. No.: 11/827,644

(22) Filed: Jul. 12, 2007

(65) Prior Publication Data
US 2008/0017483 A1    Jan. 24, 2008

(30) Foreign Application Priority Data
Jul. 18, 2006 (IT) .......................... MI2006A1395

(51) Int. Cl.
*B65G 13/02*  (2006.01)
(52) U.S. Cl. ................. 198/834; 198/778; 198/848; 198/852
(58) Field of Classification Search ................. 198/852, 198/778, 848, 834
See application file for complete search history.

(56) References Cited

U.S. PATENT DOCUMENTS

| | | | | |
|---|---|---|---|---|
| 2,776,045 A | * | 1/1957 | Heinrichs ................... | 198/834 |
| 3,270,863 A | * | 9/1966 | Ackles ...................... | 198/833 |
| 4,078,655 A | * | 3/1978 | Roinestad ................... | 198/848 |
| 4,222,483 A | * | 9/1980 | Wootton et al. ............. | 198/831 |
| 5,954,187 A | * | 9/1999 | Hager ........................ | 198/778 |
| 7,441,649 B2 | * | 10/2008 | Layne et al. ................ | 198/852 |
| 2005/0092585 A1 | * | 5/2005 | Nelson et al. ............ | 198/844.1 |
| 2005/0183936 A1 | * | 8/2005 | Neely et al. ................ | 198/852 |
| 2007/0175738 A1 | * | 8/2007 | Neely et al. ................ | 198/853 |

* cited by examiner

*Primary Examiner*—Mark A Deuble
(74) *Attorney, Agent, or Firm*—Oppedahl Patent Law Firm LLC

(57) ABSTRACT

A belt of a chain conveyor wherein the belt is composed of transverse bars, containment sidewalls, slide guides and drive chains, each chain being formed by a succession of modules, each one composed of an appropriately shaped link for fixing, without preventing axial rotation thereof, the transverse bar which forms the support surface for the products and for engaging the mechanical drive members, made in a form which has a lateral appendage shaped according to a profile suitable for engaging the motor members.

10 Claims, 6 Drawing Sheets

BELT OF A CHAIN CONVEYOR WITH INNOVATIVE DRIVE LINKS

BACKGROUND OF THE INVENTION

From Italian patent no. MI2004A002154, whereof the Applicant is holder, a chain conveyor is known, formed by a conveyor belt with transverse bars which connect two parallel chains composed of links appropriately shaped for supporting these bars and provided with means for meshing with a cogged wheel which are designed to allow transmission of the driving forces. Suitable means are provided for the support, centring and sliding of the conveyor belt on tracks spaced by transverse structural members, suitable for slidingly supporting the conveyor belt and for defining the path thereof. The conveyor belt can be provided with sidewalls suitable for containing the product to be conveyed, preventing products of a particular size from spilling over from the conveying surface of the belt.

SUMMARY OF THE INVENTION

The object of the present invention is that of providing a belt of a chain conveyor with arrangement of the drive links, in relation to the cogged wheel suitable for transmitting motion, such as to allow a different distribution of the forces on the transverse bars and preventing excessive bending in these, with the possibility of making said bars in a small diameter, with consequent saving of material, and of obtaining an overall more fluid and functional movement.

Another object of the present invention is that of providing a belt of a chain conveyor, wherein the means for meshing the links with the cogged wheel are shaped according to an involute profile or in any case suited to the transmission of motion, which allows effective transmission of the driving force, containment of wear and flexibility of movement so that it is possible to reverse the direction of forward movement of the conveyor belt.

This profile also allows a reduction in phenomena of accidental hooking between the conveyor belt and operative. Additionally the use of a profile which has the outermost part parallel to the wings of the drive links allows use, as a means for transmission of reciprocating motion to a cogged wheel, of a smooth drum which, with its lateral surface, presses against the external part of the profile, allowing the use of the conveyor belt also on systems provided with this different means for the transmission of driving force.

Further object of the present invention is that of providing a conveyor belt wherein the transverse bars are fixed to the drive links in such a way as to allow relative axial rotation between the bars and the respective links, with the consequent possibility of adaptation of the slide guides, integral with said links, to planes of sliding with different gradients between the two sides of the belt and even with the belt fully overturned, which is found to be fundamental for the processing of particular products, as well as the possibility for the links to rotate in the presence of a cogged wheel in order to adapt to the profile of the same. The driving of the belt on slanting planes, for example, usually takes place by maintaining the cogged wheel on a horizontal plane, the possibility for the links to rotate allows them to adapt, for the section in which they are in contact with the cogged wheel, their profile to that of the teeth of the wheel, ensuring improved transmission of the driving force.

All these objects are achieved by a chain conveyor belt of the type already known, with the links having the features presented in this invention.

The conveyor belt already known comprises two longitudinally parallel chains and a series of bars which constitute the transport surface and connect the two chains, in addition to a guide device comprising a pair of tracks spaced by transverse structural members. The module of each chain being formed by a co-operating link, together with the next one in the plane of the belt, with a lateral member or containment sidewall, the links being U shaped with diverging wings provided with suitable means for engaging the motor members and fixing said transverse bars axially; the lateral members already known, being shaped like a plate with polygonal section and provided with a guide for the support, centring and sliding of the conveyor belt as well as means for the support of the transverse bars aligned with and corresponding to those of the links.

The links of the chains of the known conveyor belt are shaped in such a way as to present, symmetrically on both wings, a hole near the end of the wing and a slot positioned near the joint with the other wing, having the axis parallel to the axis of the link, and preferably provided with an appendage only on the wing opposite to the conveyor belt.

The solution proposed provides for these appendages to have different and wholly innovative preferred embodiments.

The first embodiment provides for the appendage to be placed beyond the hole on the external wing in relation to the plane of the conveyor belt and to be a continuation of the same. The appendage, immediately after the hole, diverges outwards and then bends backwards, thus presenting overall a partial involute profile in the horizontal plane.

The second embodiment provides for the appendage to be placed beyond the hole on the external wing in relation to the plane of the conveyor belt and to be a continuation of the same. The appendage, immediately after the hole, diverges outwards and then, unlike the first embodiment, bends backwards, presenting a section parallel to the wings, and finally curves inwards, thus presenting overall a complete involute profile in the horizontal plane.

The third embodiment provides for the external wing of the drive link to form a single part with the lateral appendage. The external wing, no longer parallel to the internal one, a short distance after the external slot, diverges outwards, has a vertical plane facing the hole on the internal wing and finally bends inwards, thus presenting overall a complete involute profile in the horizontal plane. Facing the hole on the internal wing, on the vertical plane on the external wing, a hole is made for housing the transverse bar.

The fourth embodiment provides for the appendage to be placed beyond the hole on the external wing in relation to the plane of the conveyor belt and to be a continuation of the same. Immediately after the hole the appendage diverges outwards and then bends backwards and curves inwards, presenting overall a circular profile.

The fifth embodiment provides for the appendage to be placed beyond the hole on the external wing in relation to the plane of the conveyor belt and to be a continuation of the same. Immediately after the hole the appendage diverges outwards with a rectilinear section perpendicular to the external wing, then bends backwards and, after a section parallel to the wings of the link, bends inwards, presenting a rectangular profile overall.

The sixth embodiment provides for the appendage to be placed beyond the hole on the external wing in relation to the plane of the conveyor belt and to be a continuation of the same. Immediately after the hole the appendage diverges outwards with a rectilinear section and then bends backwards and, after a section parallel to the wings of the link, bends inwards, presenting overall a trapezoidal profile.

The conveyor belt according to the present invention is characterised in that the transverse bars have means suitable for attachment with the links which allow the relative axial rotation between each bar and the respective link.

In the present embodiment the lateral appendage is the only means whereby the link meshes with the teeth of the motor member and has a profile which adapts to the transmission of motion by cogged wheels, rotating drums or other mechanisms already known for the transmission of the motion, as shown by experimental tests.

These and other features will be made clearer from the reading of a preferred embodiment of the present invention, to be read by way of a non-limiting example of the more general concepts claimed.

BRIEF DESCRIPTION OF THE DRAWINGS

The following description refers to the accompanying drawings, in which.

DETAILED DESCRIPTION OF THE PREFERRED EMBODIMENT

Figure 1:
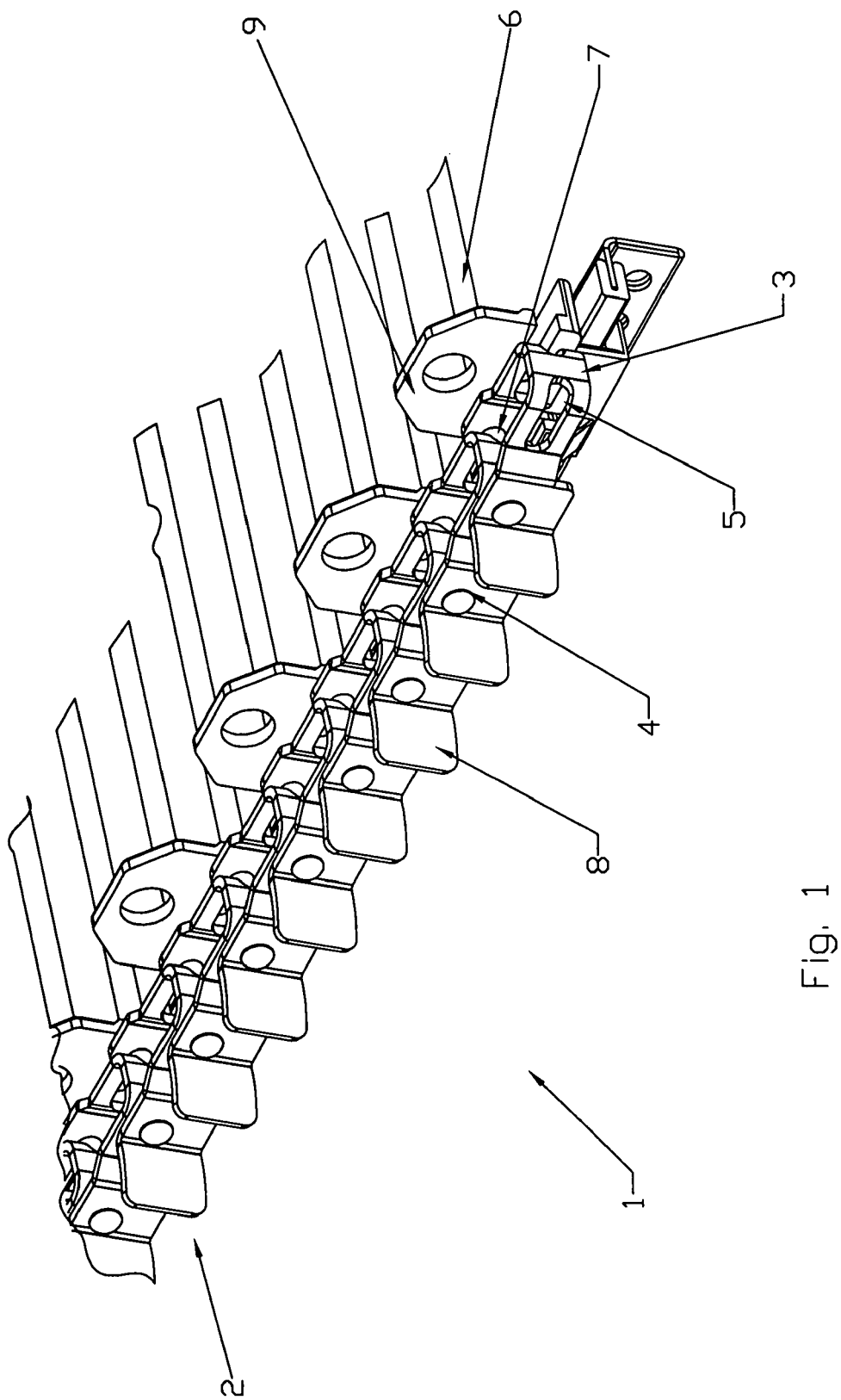
FIG. 1 is a side perspective view of the conveyor belt according to the present invention in which the arrangements of the various components can be seen.
Figure 2:
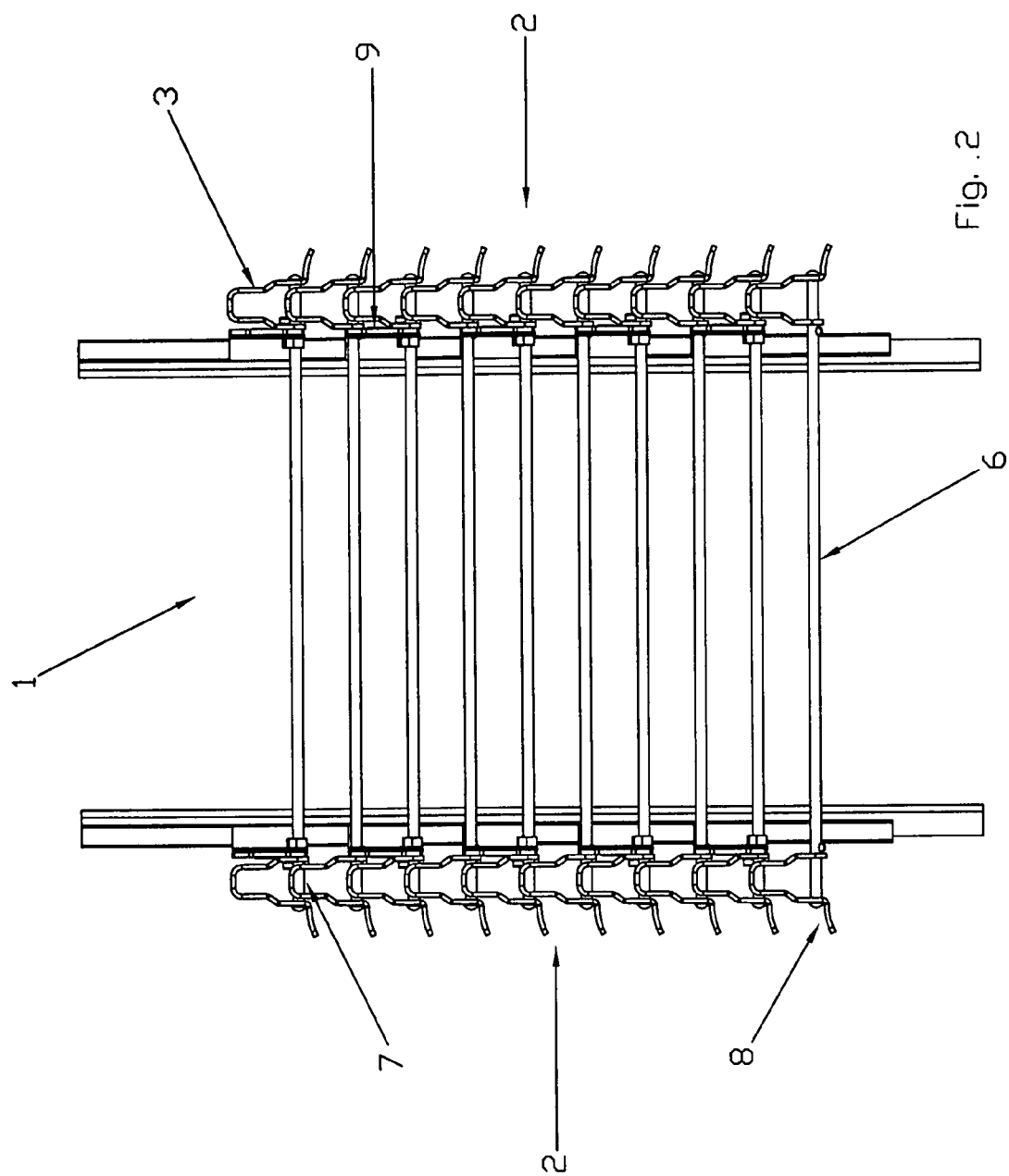
FIG. 2 shows a view from above of the conveyor belt according to the present invention.
Figure 3:
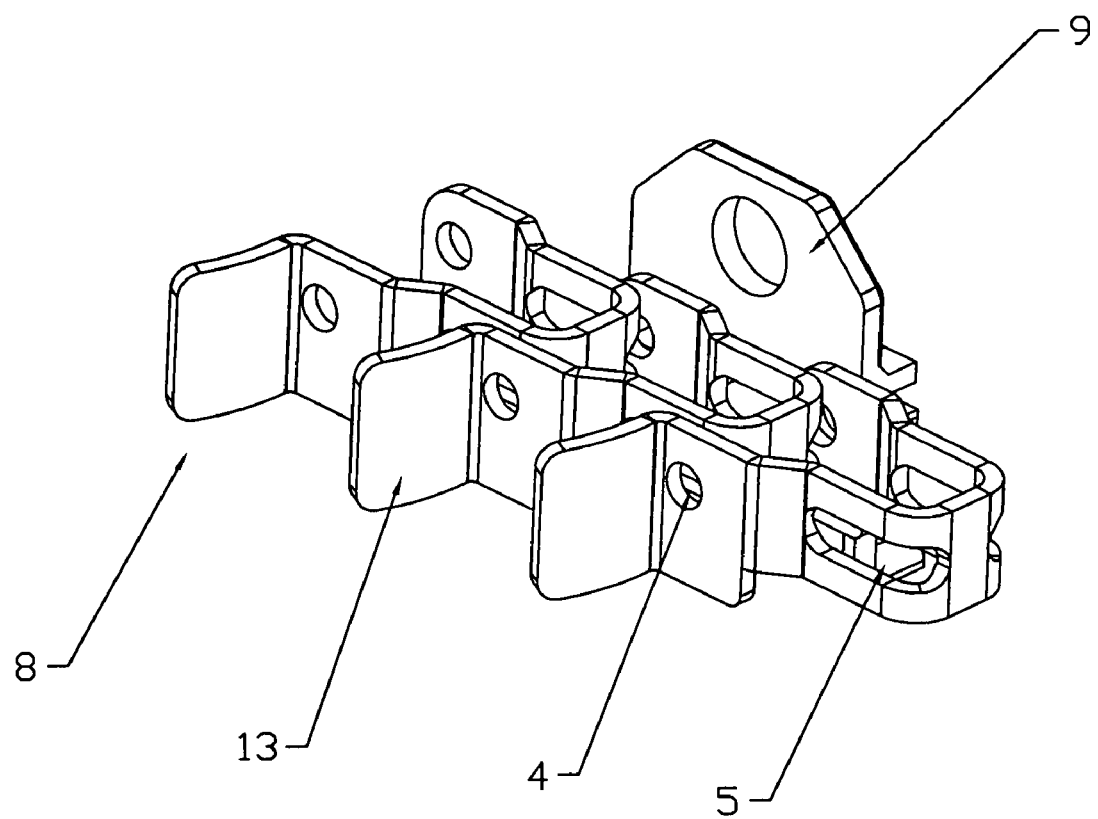
FIG. 3 shows a perspective view of the module of the chain of the conveyor belt on the outer side in relation to the plane of the belt.

Referring to FIGS. 1, 2 and 3, the already known conveyor is shown, with a conveyor belt 1, wherein the two longitudinal parallel chains 2 are formed by a series of adjacent links 3, flanked in the plane of the belt by a lateral member 9, also referred to as containment sidewall. The two ends of a bar 6 are inserted simultaneously in the end holes 4 of an opposite pair of links and in the slots 5 of the previous pair, positioned inside the first, as shown in FIG. 2, in such a way that the end 7 of the bar does not project more than the length necessary for its fixing with the link.

The fixing of the transverse bar 6 inserted in the holes 4 is provided in two embodiments, listed here by way of a non-limiting example of the more general concept claimed: a mechanical fixing system and a system which acts thanks to the plastic deformation of the bar, both already known. These embodiments, or their equivalents, allow the relative rotation of the link in relation to the bar around a rotation axis coinciding with the axis of the bar, blocking any other type of movement.

Each bar, in addition to passing through the holes 4, passes inside the slots 5 of the adjacent link, shown in FIG. 3, thus ensuring a certain flexibility for the chain assembly.

Each link 3, only on the wing opposite the conveyor belt, has an appendage 8 shaped according to an involute profile in relation to the horizontal plane. As can be seen in FIGS. 1, 2 and 3 a preferred embodiment of this appendage 8 has only one portion of involute profile, while other embodiments, as shown in FIGS. 4a, 4b, 5a, 5b and 5c, provide for the complete U-shaped development of this profile, with various forms which will be illustrated herein below.

Referring to FIG. 3, the first preferred embodiment is shown, whereby the appendage 8 has a section 13 placed immediately after the hole 4 on the external wing which bends outwards, thus presenting overall an appendage with a partial involute profile.

Figure 4A:
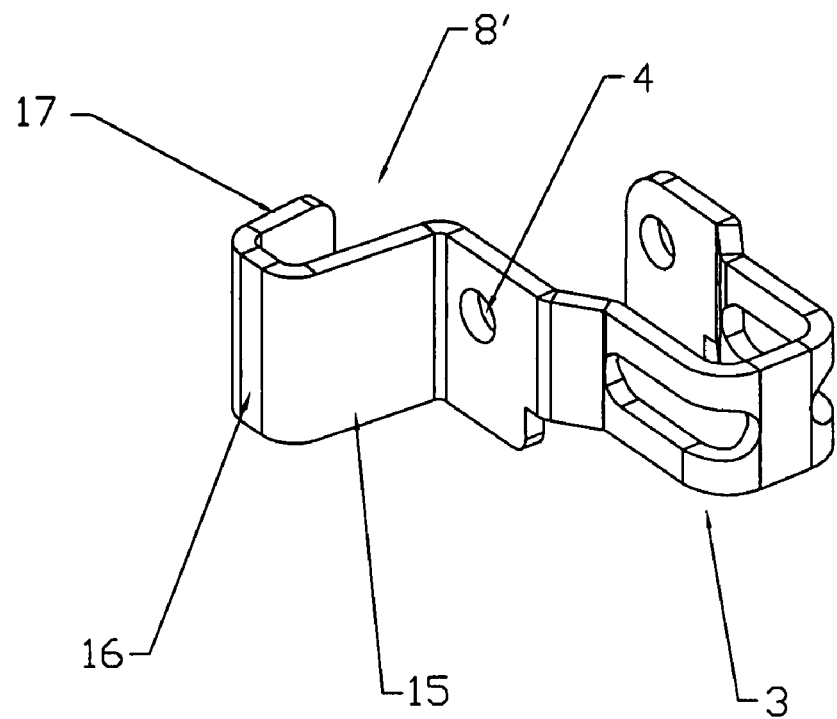
FIGS. 4a, 4b show a link of the module of the chain provided with an appendage with complete involute profile, with hole either next to the same or on the appendage respectively.

FIG. 4a shows the second preferred embodiment, wherein the appendage 8' has a section 15 placed immediately after the hole 4 on the external wing which bends outwards, a subsequent section 16, which is joined to the previous one, parallel to the wings and a final section 17 which bends inwards, thus presenting overall an appendage with a complete involute profile.

Figure 4B:
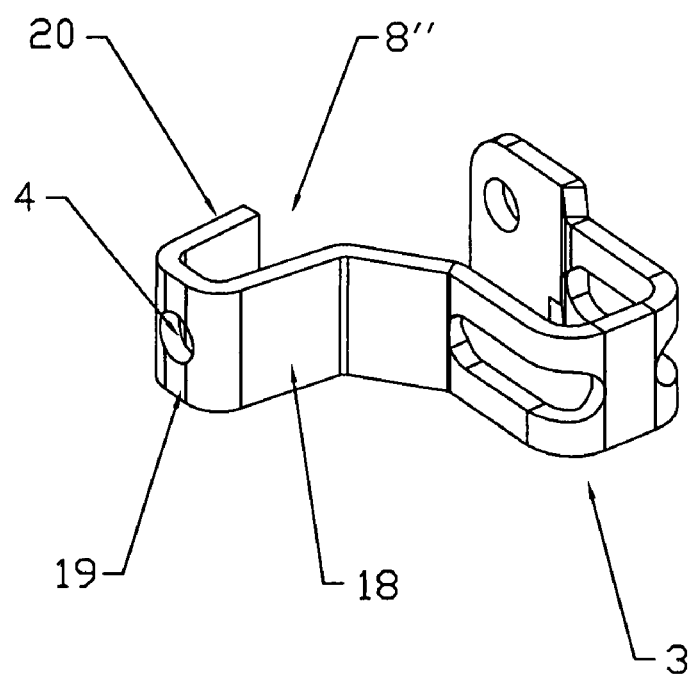

FIG. 4b shows the third preferred embodiment whereby the external wing also serves the purpose of appendage 8" and has a section 18, immediately after the slot 5, which bends outwards, a section 19, which is joined to the previous one, parallel to the other wing, and a final section 20 which bends inwards, thus presenting overall a complete involute profile.

The hole 4 is placed symmetrically in relation to the wings of the link 3 or, according to the embodiment illustrated in FIG. 4b, on the end of the appendage 8".

Figure 5A:
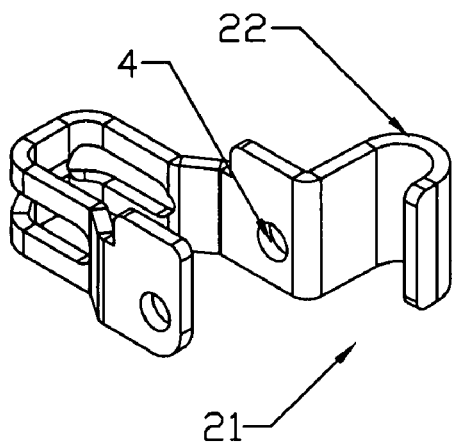
FIGS. 5a, 5b and 5c show a link of the module of the chain provided with an appendage with circular, rectangular and trapezoidal profile respectively.

Referring to FIG. 5a, it shows the fourth preferred embodiment in which the appendage 21 has a rectilinear section placed immediately after the hole 4 on the external wing which diverges outwards and perpendicular thereto, and then bends backwards and inwards with a section 22 which has a circular profile.

Figure 5B:
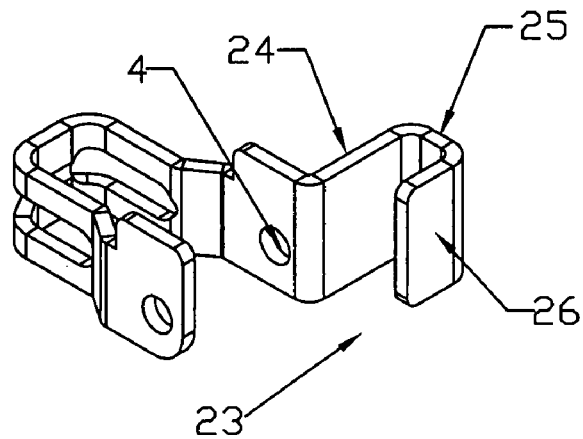

Referring to FIG. 5b, it shows the fifth preferred embodiment, wherein the appendage 23 diverges outwards with a rectilinear section 24 perpendicular to the external wing immediately after the hole 4, and then bends backwards with a section 25 parallel to the wings of the link, and finally bends inwards with a rectilinear section 26 parallel to the section 24, presenting overall a rectangular profile.

Figure 5C:
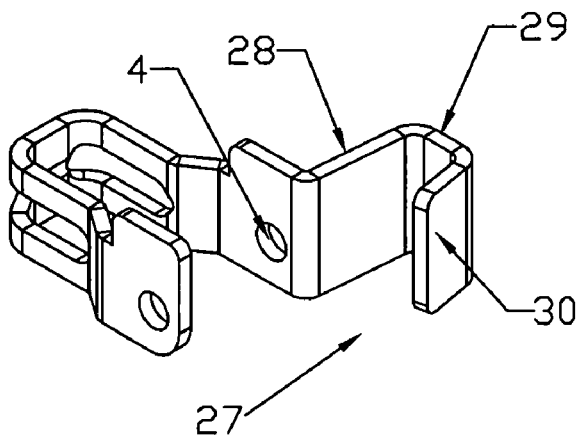

Referring to FIG. 5c, it shows the sixth preferred embodiment wherein the appendage 27 diverges outwards with an oblique rectilinear section 28 in relation to the external wing immediately after the hole 4, then bends backwards with a section 29 parallel to the wings of the link, and finally bends inwards with a rectilinear section 30, presenting overall a trapezoidal profile.

The profile of the appendage thus allows transmission of more homogeneous forces by the cogged wheel, avoiding phenomena of wear and the onset of bending and torsion on the links, which influence the proper sliding of the belt. A U-shaped profile of the appendage, as in all the preferred embodiments not including the first, also allows the reversal of the direction of forward movement of the conveyor belt, preventing the teeth of the driving wheel from trapping between the appendages.

Figure 6:
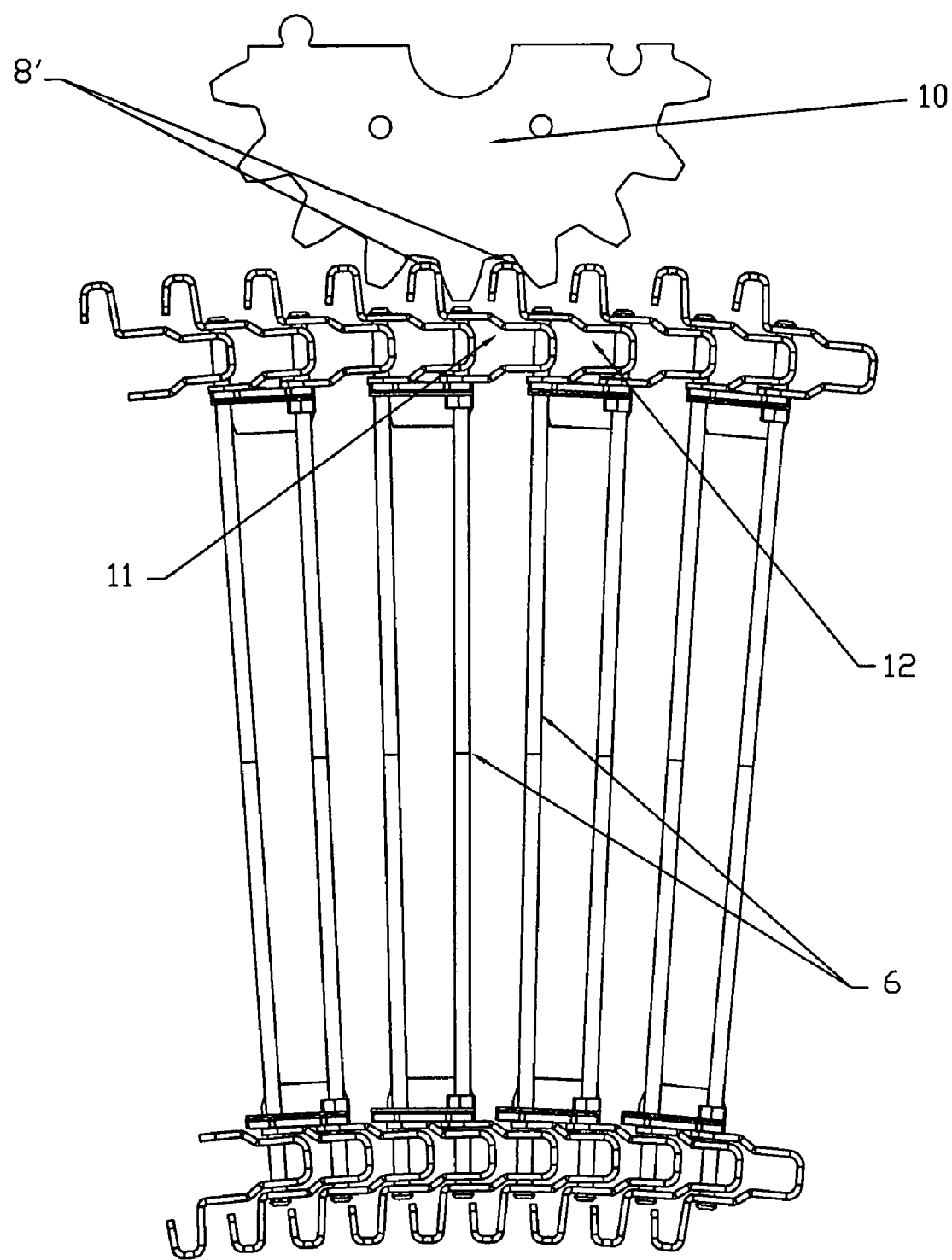
FIG. 6 shows a detail of the meshing of the links of the chain with the cogged wheel for the transmission of movement.

Referring to FIG. 6, the arrangement of the drive links 11 and 12 and the involute profile of the wings 8' are such that at every moment the force transmitted by the cogged wheel 10 involves two adjacent links, allowing a more homogeneous distribution of the forces and less bending of the transverse bars 6.

The drive links according to the present invention thus allow the manufacture of a conveyor belt with thinner transverse bars subject to less bending, able to adapt to paths with gradients which differ on one side and on the other of the belt or between the plane of the belt and the plane of the motion transmission members, also entailing less wear of the surfaces of contact with the motor members and making the movement of the belt more fluid and functional overall.

What is claimed is:

1. A belt of a chain conveyor, comprising: two longitudinally parallel chains and a series of transverse bars which form a transport surface and connect the two chains, wherein each chain is formed by adjacent links, flanked in a plane of the belt by a lateral member, each link being U-shaped with diverging wings provided with holes suitable for housing said transverse bars, said link being provided with an appendage suitable for transmission of motion, characterised in that the link has a lateral appendage placed beyond the hole on an external wing of said diverging wings in relation to the plane of the conveyor belt as a continuation of the same and which, immediately after the hole, diverges outwardly for a section and subsequently bends in the opposite direction with respect to the direction in which the external wing extends, presenting a section parallel to the wings and finally a section which curves inwardly, so as to have overall a complete involute profile in a horizontal plane.

2. A belt of a chain conveyor, comprising: two longitudinally parallel chains and a series of transverse bars which form a transport surface and connect the two chains, wherein each chain is formed by adjacent links, flanked in a plane of the belt by a lateral member, each link being U-shaped with diverging wings provided with holes suitable for housing said transverse bars, said link being provided with an appendage suitable for transmission of motion, characterised in that the link has an external wing of said diverging wings which also performs functions of a lateral appendage suitable for the transmission of motion; said external wing diverging outwardly for a section, with a vertical plane at the hole on an internal wing of said diverging wings, and finally a section which bends inwardly, so as to present overall a complete involute profile in a horizontal plane.

3. A belt of a chain conveyor, comprising: two longitudinally parallel chains and a series of transverse bars which form a transport surface and connect the two chains, wherein each chain is formed by adjacent links, flanked in a plane of the belt by a lateral member, each link being U-shaped with diverging wings provided with holes suitable for housing said transverse bars, said link being provided with an appendage suitable for transmission of motion, characterised in that the appendage has a rectilinear section placed immediately after the hole on an external wing of said diverging wings which diverges outwardly and perpendicular to said wing, and then bends inwardly and in the opposite direction with respect to the direction in which the external wing extends, presenting a circular profile in a horizontal plane.

4. A belt of a chain conveyor, comprising: two longitudinally parallel chains and a series of transverse bars which form a transport surface and connect the two chains, wherein each chain is formed by adjacent links, flanked in a plane of the belt by a lateral member, each link being U-shaped with diverging wings provided with holes suitable for housing said transverse bars, said link being provided with an appendage suitable for transmission of motion, characterised in that said appendage diverges outwardly with a rectilinear section perpendicular to an external wing of said diverging wings immediately after the hole of said external wings, and then bends backwardly with a section parallel to the wings of the link, and finally bends inwardly with a rectilinear section, presenting overall a rectangular profile in a horizontal plane.

5. A belt of a chain conveyor, comprising: two longitudinally parallel chains and a series of transverse bars which form a transport surface and connect the two chains, wherein each chain is formed by adjacent links, flanked in a plane of the belt by a lateral member, each link being U-shaped with diverging wings provided with holes suitable for housing said transverse bars, said link being provided with an appendage suitable for transmission of motion, characterised in that the appendage diverges outwardly with an oblique rectilinear section in relation to an external wing of said diverging wings immediately after the hole of said external wings, and then bends backwardly with a section parallel to the wings of the link, and finally bends inwardly with a rectilinear section, presenting overall a trapezoidal profile in a horizontal plane.

6. A belt of a chain conveyor according to claim 1, 3 4 or 5, characterised in that the link has, symmetrically on both wings, a hole near the end of the wing.

7. A belt of a chain conveyor according to claim 1, characterised in that the link has a hole near an end of an internal wing of said diverging wings, and a counter-lateral hole at the end of the appendage.

8. A belt of a chain conveyor according to the claim 1, 2, 3, 4 or 5, characterised in that each transverse bar is fixed to each link at the hole with mechanical means or by means of plastic deformations of the bar, allowing axial rotation of the link in relation to the bar.

9. A belt of a chain conveyor according to the claim 1, 2, 3, 4 or 5, characterised in that each link can rotate in relation to an axis of the bar when it is in contact with a cogged wheel to adapt the profile of the drive appendage to the profile of said cogged wheel.

10. A belt of a chain conveyor according to the claim 1, 2, 3, 4 or 5, characterised in that the arrangement of each link of the chain and the profile of each of the appendages allow a cogged wheel to act on one or more consecutive links simultaneously, with even distribution of forces.

* * * * *